United States Patent
Becker et al.

(10) Patent No.: US 7,033,158 B2
(45) Date of Patent: Apr. 25, 2006

(54) INJECTION UNIT FOR AN INJECTION MOULDING MACHINE

(75) Inventors: Klaus Becker, Wetter (DE); Ralf Ingo Meyer, Hagen (DE); Robert Weinmann, Weesen (CH)

(73) Assignee: Mannesmann Plastics Machinery GmbH, Munich (DE)

( * ) Notice: Subject to any disclaimer, the term of this patent is extended or adjusted under 35 U.S.C. 154(b) by 167 days.

(21) Appl. No.: 10/433,451

(22) PCT Filed: Dec. 3, 2001

(86) PCT No.: PCT/DE01/04593

§ 371 (c)(1),
(2), (4) Date: Jun. 3, 2003

(87) PCT Pub. No.: WO02/45939

PCT Pub. Date: Jun. 13, 2002

(65) Prior Publication Data

US 2004/0018270 A1    Jan. 29, 2004

(30) Foreign Application Priority Data

Dec. 4, 2000 (DE) ................................ 100 61 329

(51) Int. Cl.
*B29C 45/77* (2006.01)

(52) U.S. Cl. ..................................... 425/150; 264/40.7
(58) Field of Classification Search .................... 425/3, 425/587, 150; 264/40.7
See application file for complete search history.

(56) References Cited

U.S. PATENT DOCUMENTS 5,679,384 A     10/1997  Emoto
6,051,896 A  *  4/2000   Shibuya et al. ................. 425/3

FOREIGN PATENT DOCUMENTS

DE            199 20 626 A1     11/2000

* cited by examiner

*Primary Examiner*—Tim Heitbrink
(74) *Attorney, Agent, or Firm*—Cohen, Pontani, Lieberman & Pavane

(57) ABSTRACT

An injection screw is rotationally driven by a rotating motor having a stator and a rotor and can be moved by a number of electrical linear motors, linear motor comprising a primary part, which functions as a stator, and a secondary part, which is linearly movable in the axial direction in a screw cylinder to execute the injection function. The primary parts are assembled to form a first housing-like unit and the secondary parts are assembled to form a second housing-like unit which is coupled to the screw for drive purposes. The rotating motor, fixedly connected to the screw in the axial direction, is arranged with its stator fixedly coupled in the axial direction to the secondary housing-like unit.

14 Claims, 4 Drawing Sheets

INJECTION UNIT FOR AN INJECTION MOULDING MACHINE

PRIORITY CLAIM

This is a U.S. national stage of application No. PCT/DE01/04593, filed on Dec. 03, 2001. Priority is claimed on that application on the following application: Country: Germany, Application No.: 100 61 329.2, Filed: Dec.04, 2000.

BACKGROUND OF THE INVENTION

1. Field of the Invention

The invention relates to an injection unit for an injection-molding machine for processing plastics or other plasticized materials.

2. Description of the Related Art

Injection-molding machines for processing thermoplastic materials, for example, have been known for many years. In such an injection-molding machine, usually plastics pellets are heated up and melted in a heated plasticizing cylinder, in which a screw rotates, and the melt is subsequently injected under high pressure into the cavity of an injection mold. The molten plastics material is then cooled down, so that it solidifies and is given its final shape. The cooled-down injection-molded parts are ejected after the mold has been opened. Apart from its injection unit, an injection-molding machine also includes a closing unit for opening and closing the split injection mold. Apart from a screw cylinder, the injection unit also includes an injection nozzle for injecting the molten material into the closed mold. Arranged in the screw cylinder is a screw, which can be moved back and forth in the axial direction to execute the injection function, the length of the axial path of displacement directly determining the amount of material injected.

An electric motor is usually used for the rotational drive of the screw, with a mechanical gear mechanism often being interposed. For the axial movement of the screw during injection, hydraulic drives are mostly used.

In particular for producing relatively small injection-molded parts, injection-molding machines which have a purely electrical drive have become known in recent years. That is to say that the axial longitudinal movement of the screw is also performed by means of an electric drive.

EP 0 723 848 B1, which corresponds to U.S. Pat. No. 5.679,384. discloses a number of different embodiments of such fully electrical injection-molding machines. In one generic type of injection-molding machine, it is provided that the screw can be moved together with the electrical rotational drive unit, which is coupled to the screw, on a carriage, the moving of the carriage taking place by means of an electromotively driven spindle drive. Consequently, in this case two electrical rotational drives are used, one of which uses the spindle drive to convert the rotational movement into a linear movement for the injecting operation.

Another type of injection-molding machine described in EP 0 723 848 B1 provides two electrical hollow-shaft motors lying one behind the other, the first of which has in its rotor a spindle nut for a ballscrew, which interacts with a ballscrew connected directly to the screw of the injection-molding machine, while the second electric motor has on its rotor a splined-shaft nut, which interacts with a splined shaft which directly adjoins the ballscrew. The length of the splined shaft corresponds at least to the axial path of displacement of the screw for the injecting operation. During the return movement of the screw in the material-collecting phase of the injection-molding cycle, both motors are driven at the same speed and in the same direction of rotation. As a result of the counter-pressure formed by the injection nozzle, in this case the screw is pushed linearly backward. Since the splined shaft is in engagement with the splined-shaft nut, in this case the rotational drive remains undiminished. During the injection phase, the motor for the rotational drive is switched off and only the motor with the spindle nut continues to move. Since the screw can no longer rotate, the rotation of the spindle nut enforces an axial movement of the screw in the direction of the injection nozzle and the melt material which has collected in front of the screw is injected into the injection mold.

Injection-molding machines in which the rotational drive of the screw is generated by means of an electrical rotating motor and the linear displacement of the screw for the injecting operation is generated by an electrical linear drive have also already become known. In this case, four linear motors in a parallel arrangement are used, the linear motors being connected to one another to form a cuboidal, housing-like group. The electrical rotational drive and the linear motors are in this case arranged one behind the other in the axial direction. The advantage of the electrical linear drive lies in particular in the high accelerating capability and, as a result, great injection speed. The comparatively great overall axial length of such an injection unit can be seen as a disadvantage.

SUMMARY OF THE INVENTION

The object of the present invention is to improve an injection unit of the generic type to the extent that it has a particularly compact overall length, that is as short as possible in the axial direction, while having a very high injection speed, in particular for producing relatively small to medium-sized injection-molded parts.

The invention is based on an injection unit for an injection-molding machine for processing plastics or other plasticized materials which has a screw which is provided with a rotational drive by means of a rotating motor having a stator and a rotor and can be moved by a number of electrical linear motors in each case comprising a primary part, which functions as a stator, and a secondary part, which is linearly movable with respect to said primary part. In this case, the linear motors are assembled to form a housing-like group with the secondary parts of the linear motors arranged parallel to one another and the secondary parts of the linear motors coupled to the screw for drive purposes, so that linear drive forces can be transferred to the screw. According to the invention, it is provided that the rotating motor, fixedly connected to the screw in the axial direction, is arranged within the housing-like group and, with its stator, is fixedly coupled in the axial direction to the secondary parts of the linear motors. In this way, the overall axial length of the injection unit is distinctly reduced.

In principle, the rotating motor for the rotation of the screw may be of any desired type, that is for example a hydraulic motor. However, electrical rotating motors, in particular hollow-shaft motors, which permit a particularly high drive torque with a low weight, are particularly preferred for this. The electrical rotating motor is expediently a synchronous motor.

Particularly preferred is an embodiment in which three linear motors are combined to form the housing-like group. The three linear motors are expediently of the same construction, so that the form of an equilateral triangle is obtained in the axial cross section of the housing-like group.

It is advantageous to assemble the secondary parts of the linear motors by connecting elements to form a self-supporting assembly.

The secondary parts are expediently arranged in each case on a carrier guided in linear guides. This carrier may be respectively formed for example as a carriage and the linear guides may be respectively formed as sliding rails. For reasons of wear, it is recommendable to support the carrier on the linear guides in each case by means of rolling bodies, that is to avoid sliding friction as far as possible. This can also be advantageously ensured by the carrier being formed as a carriage with wheels, which roll on the linear guides.

The connecting elements for the assembly of the secondary parts of the linear motors are advantageously formed as transverse carriers in plate form, arranged at intervals one behind the other in the axial direction. These transverse carriers are arranged perpendicularly in relation to the longitudinal axis of the linear motors. In this case, it is advantageous to fasten the electrical rotating motor to the forwardmost transverse carrier in the direction of injection, that is the transverse carrier lying closest to the injection nozzle. This transverse carrier has an aperture for the drive shaft of the rotating motor or the screw or a corresponding connecting element (coupling) to pass through.

With regard to the primary parts of the linear motors, it is recommendable to fasten them in each case to the bottom of a cross-sectionally U-shaped receiving bed, the ends of the mutually parallel side legs of the U form of the receiving bed forming the linear guides for supporting the carriers of the secondary parts. To ensure that the receiving beds are mechanically held together with respect to one another, the receiving beds may be fixedly connected to one another by connecting bars lying against the side legs of the U form from the outside.

The invention is explained in more detail below on the basis of the exemplary embodiment of an injection unit according to the invention, represented partly schematically in the figures.

DETAILED DESCRIPTION OF THE PRESENTLY PREFERRED EMBODIMENTS

Figure 1:
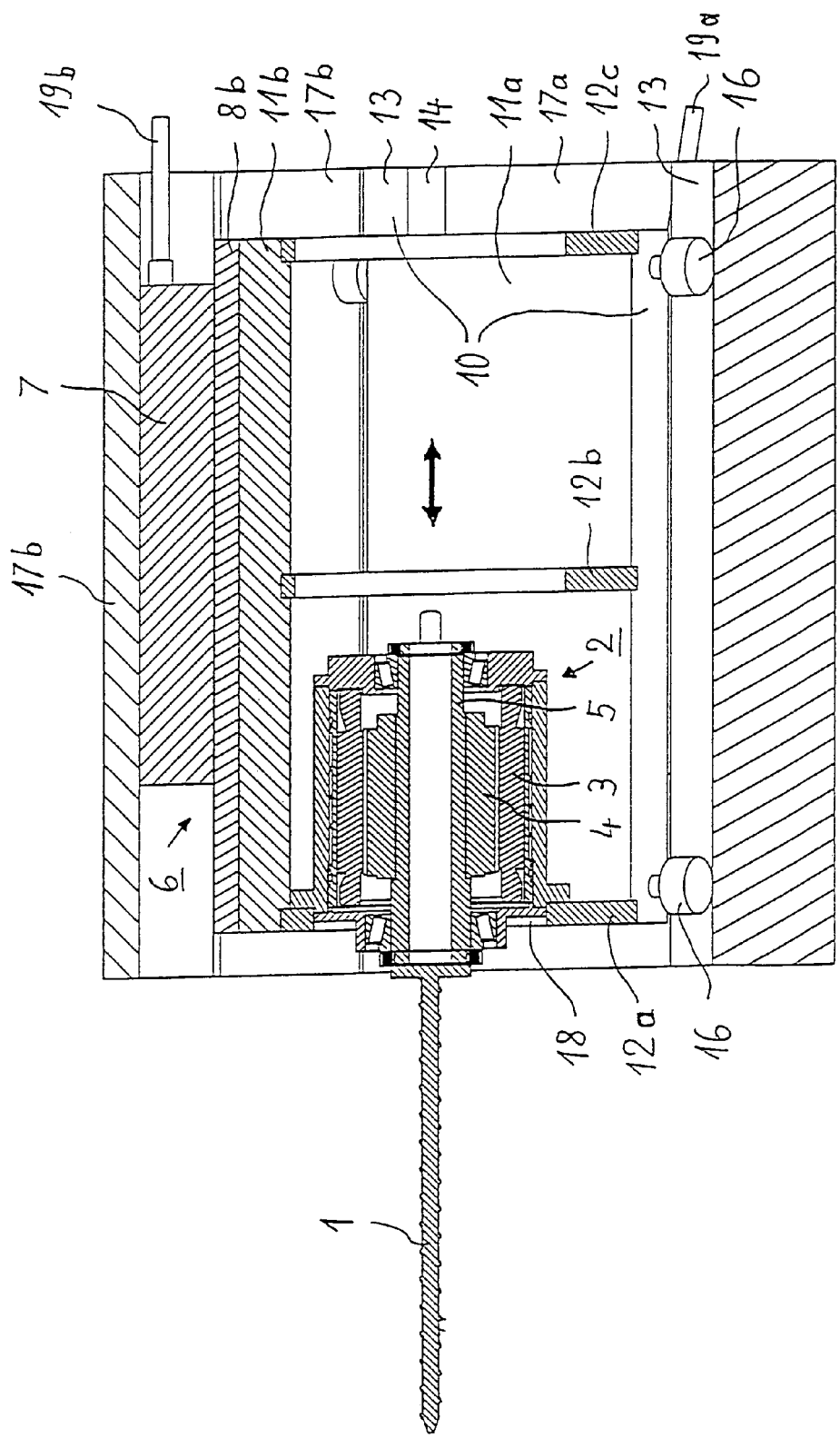
FIG. 1 shows a longitudinal section through an injection unit according to the invention.

The injection unit according to the invention, represented in various views and sections in FIGS. 1 to 4, has a screw 1, which is connected to the rotor 4 of an electrical hollow-shaft motor 2 having a stator 3 and a hollow shaft 5. The hollow-shaft motor 2 is connected with its housing, and consequently also with its stator 3, in a rotationally fixed manner by means of a transverse carrier 12a, formed as a plate, to an assembly which is formed by three secondary parts 8a, b, c, i.e. the movable parts of three electrical linear motors 6. This structural unit can be seen particularly well in a separate representation in FIG. 3. The secondary parts 8a, b, c are mounted in respective flat carriers 11a, b, c, which have the cross-sectional form of a very flat U. The carriers 11a, b, c are connected to one another by three transverse carriers 12a, b, c arranged one behind the other at axial intervals. As can already be clearly seen from FIG. 1, the hollow-shaft motor 2 is arranged within the volume enclosed by the carriers 11a, b, c, by flange-mounting on the front transverse carrier 12a. In order that the screw 1 or the hollow shaft 5 can be passed through the transverse carrier 12a to the outside, carrier has an aperture 18 of a correspondingly large format. It can further be seen from FIG. 3 that the carriers 11a, b, c are provided in the region of their short side legs with wheels or rollers 16.

Figure 2:
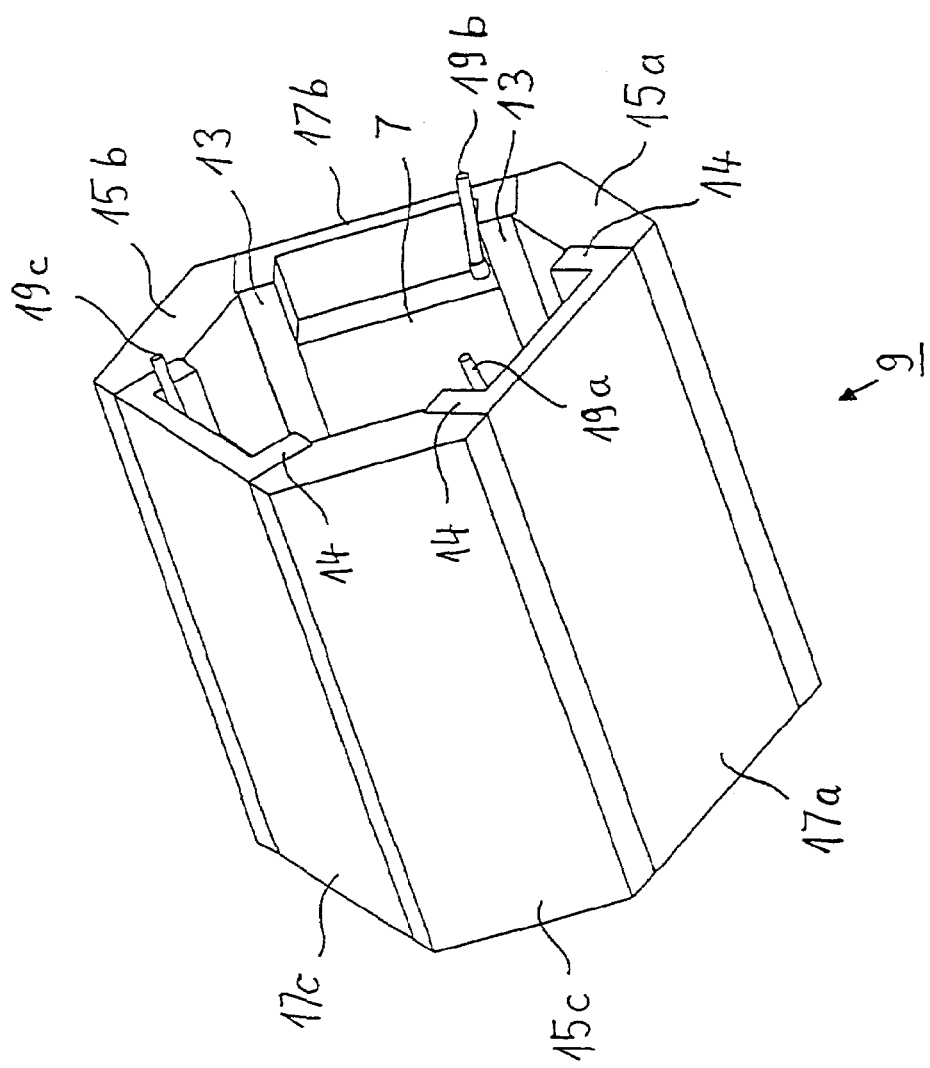
FIG. 2 shows the housing-like group of primary parts of the linear motors from FIG. 1.
Figure 3:
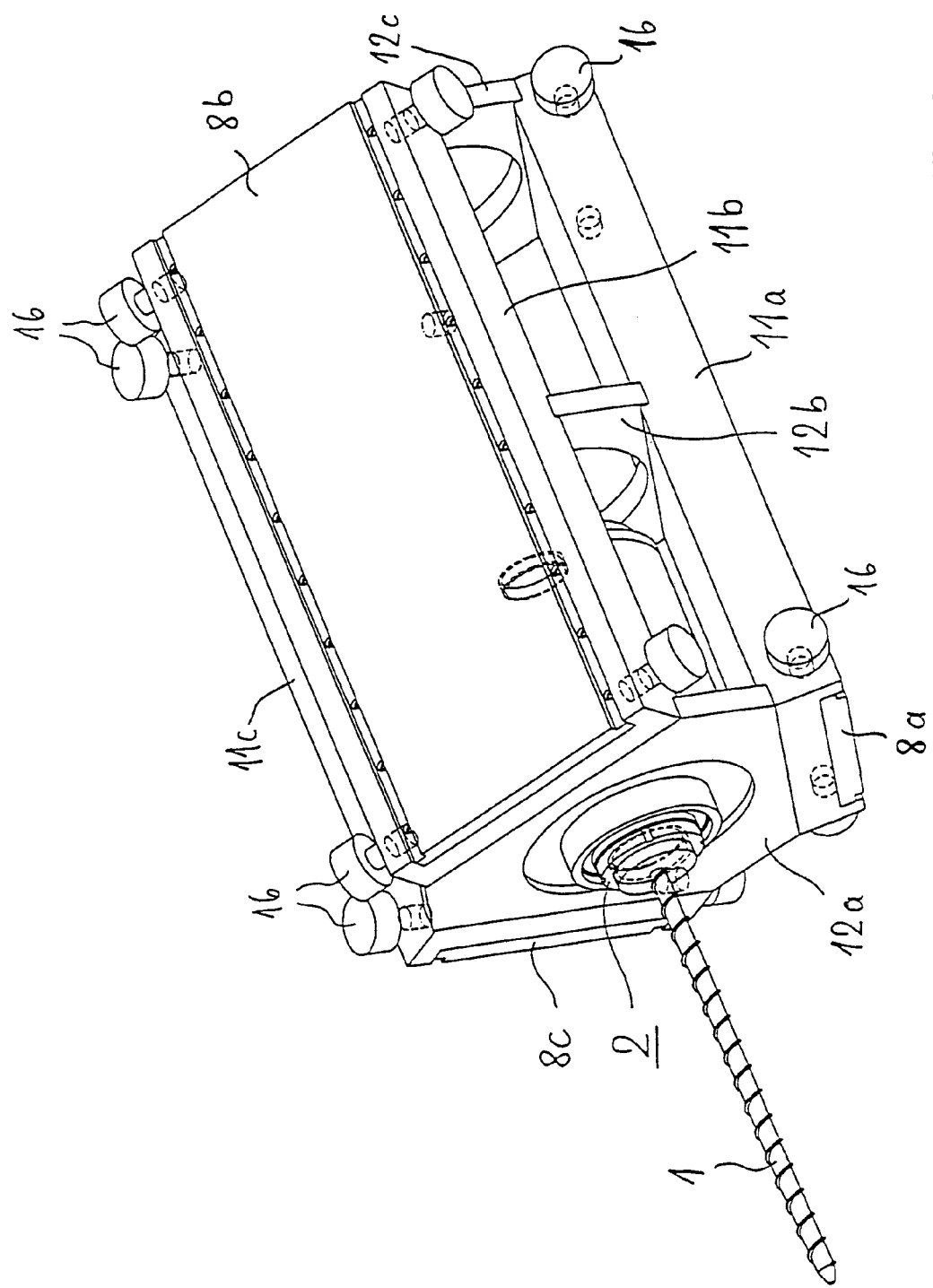
FIG. 3 shows the secondary parts of the linear motors according to FIG. 1, connected to form a structural unit.
Figure 4:
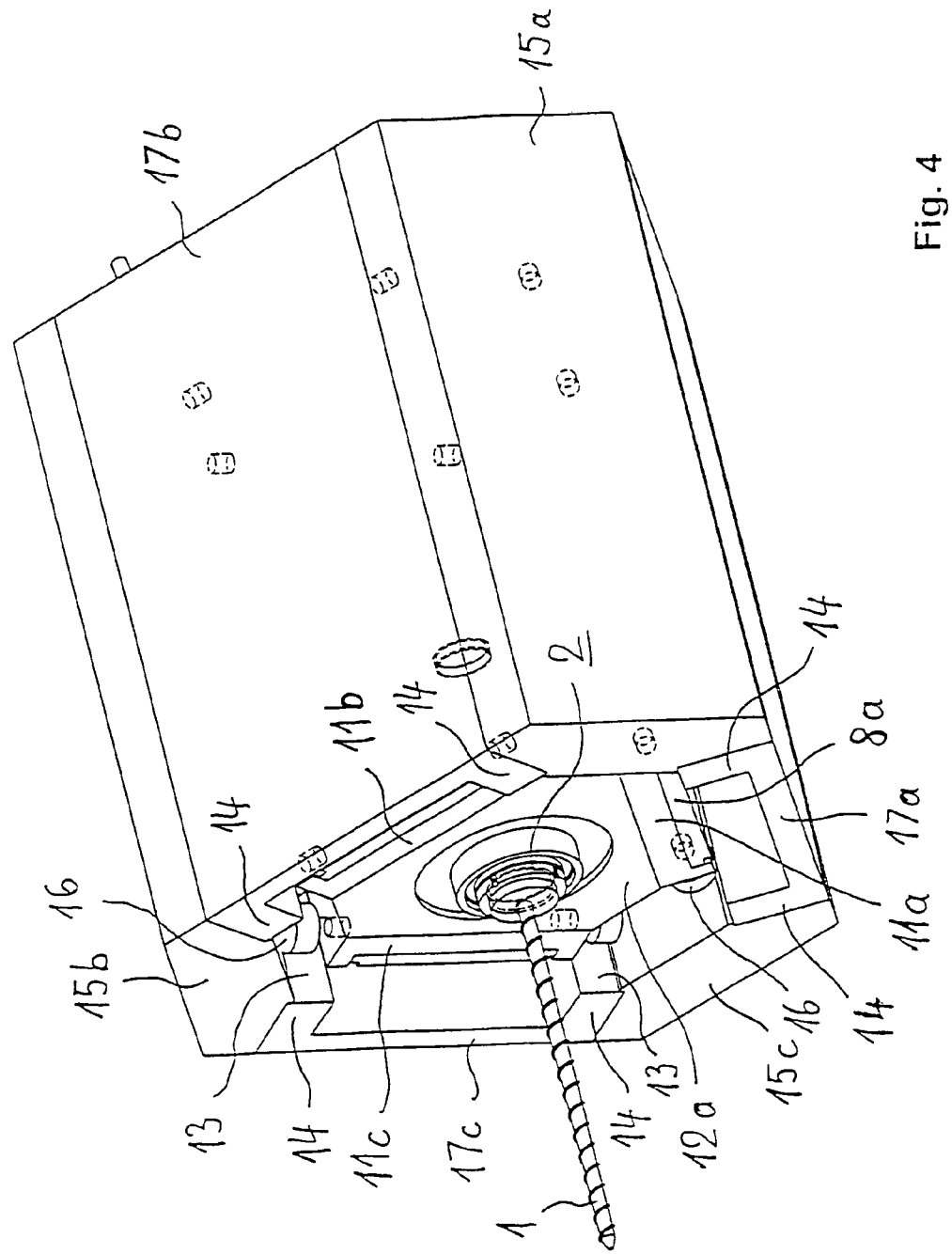
FIG. 4 shows a perspective view according to FIG. 1.

FIG. 2 shows that the primary parts 7, that is the stationary parts of the electrical linear motors 6, are assembled to form a housing-like group 9, corresponding to the form of the assembly in FIG. 3. The primary parts 7, only one of which can be seen in the view chosen, are in each case embedded for this purpose in a receiving bed 17a, b, c. Since they are formed with the same construction, in principle the three linear motors 6 form an equilateral triangle in cross section. In a way similar to the carriers 11a, b, c, the receiving beds 17a, b, c have a U form in cross section, the primary parts 7 in each case being arranged on the bottom of the U form (on the inner side). Toward the longitudinal side, the primary parts 7 are enclosed by the side legs 14. The ends 13 of the side legs 14 form linear guides 10 (FIG. 1), on which the wheels 16 of the carriers 11a, b, c are supported when the assembly according to FIG. 3 is fitted into the housing-like group 9 according to FIG. 2, as is represented in the perspective view in FIG. 4. The receiving beds 17a, b, c for the primary parts 7 can also be shaped in such a way that they can be directly connected, for example by means of screw connections, to form an interconnected structural unit. However, connecting bars 15a, b, c are preferably used for the connections, as represented in FIGS. 3, 4. These connecting bars 15a, b, c are placed against the side faces of the legs 14 from the outside and connected to them in a way not represented, for example by screws. In FIG. 1, it can be seen that the transverse carriers 12b, c are also provided with large-area apertures, so that the hollow-shaft motor 2 is accessible from the right-hand side.

An electrical connection cable for the primary part 7 of the linear motor 6, represented in section, is designated by the reference numeral 19b. The connection cable 19a belongs to the primary part, which cannot be seen, of the second linear motor.

The operating principle of the injection unit according to the invention is as follows. During the phase of collecting the melt in the front part of the screw cylinder (not represented), the structural unit mounted on the wheels 16, with the carriers 11a, b, c and the secondary parts 8a, b, c and also the hollow-shaft motor 2, is forcibly displaced to the right as a result of the melt pressure which has built up on the injection nozzle (not represented). If need be, the screw 1 can be subjected to a moderate forward thrust, which acts to the left with respect to the representation in FIG. 1, that is in the direction of the injection nozzle, by the three linear motors 6 to increase the counter-pressure on the melt. When sufficient melt material has collected in the screw cylinder, the linear motors 6 are electrically activated in such a way that they generate a forward thrust to the left sufficient for the respectively desired injection pressure, and the structural unit mounted on the wheels 16 is abruptly displaced with the screw 1 in the direction of the injection nozzle. As a result, the collected melt material is injected with the required injection pressure into the injection mold which is connected to the injection nozzle and is not represented in the figures. The linear motors 6 are formed with large surface areas with respect to the cross-sectional area of the screw 1 and can therefore bring about a considerable injection pressure.

Instead of the cross-sectionally triangular arrangement of the linear motors, which is preferably chosen, if need be it is of course also possible to choose another, preferably polygonal form, for example a pentagonal form. With respect to the dimensions of the electrical rotating motor located within the arrangement of the linear motors, however, the triangular arrangement already provides a very large effective surface area for the linear motors 6. Since no additional space is required for the electrical rotating motor, a particularly short overall axial length can be realized with the injection unit according to the invention.

The invention claimed is:

1. An injection unit for an injection molding machine for processing plastics or other plasticized materials, said injection molding machine comprising:
   an injection screw;
   a rotating motor for rotating said screw, said rotating motor being axially fixed with respect to said screw and comprising a rotational stator and a rotational rotor located inside said stator; and
   a linear motor arrangement for moving said rotating motor axially, said linear motor arrangement comprising a plurality of linear motors, each of said linear motors comprising a primary part and a secondary part, wherein said primary parts are assembled to form a first housing group, and said secondary parts are assembled to form a second housing group which is movable linearly within said first housing group,
   wherein said stator of said rotating motor is axially fixed to said second housing group.

2. An injection unit as in claim 1 wherein said rotating motor is an electric motor with a hollow shaft to which said rotor is fixed.

3. An injection unit as in claim 2 wherein said rotating motor is a synchronous motor.

4. An injection unit as claimed in claim 1 wherein said linear motor arrangement comprises three linear motors.

5. An injection unit as in claim 4 wherein said linear motor arrangement has substantially the form of an equilateral triangle in axial cross section.

6. An injection unit as in claim 1 wherein said second housing group comprises transverse members to which said secondary parts are assembled to form a self-supporting assembly.

7. An injection unit as in claim 6 wherein said second housing group comprises a plurality of carriers to which respective secondary parts are fixed, said first housing group comprising a plurality of linear guides in which said carriers are guided linearly.

8. An injection unit as in claim 7 wherein each said carrier is formed as a carriage and each said linear guide is formed as a sliding rail.

9. An injection unit as in claim 7 further comprising rolling bodies which support said carriers on said linear guides.

10. An injection unit as in claim 7 wherein each said carrier comprises a carriage with wheels.

11. An injection unit as in claim 7 wherein said transverse members comprise plates arranged at axial intervals, said plates being arranged perpendicularly to the axis of the linear motor.

12. An injection unit as in claim 11 wherein said transverse members comprise a forewardmost transverse member closest to said screw and having an aperture for said screw, said rotating motor being fixed to said forewardmost transverse member.

13. An injection unit as in claim 7 wherein said first housing group comprises a plurality of receiving beds which are U-shaped in axial cross-section, each said receiving bed having a pair of parallel side legs between which a respective said primary part is received, each pair of parallel side legs forming a linear guide.

14. An injection unit as claimed in claim 13 wherein each said first housing group comprises a plurality of connecting bars, each said connecting bar lying against a pair of side legs of adjacent said receiving beds.

* * * * *